(12) United States Patent
Koshimizu et al.

(10) Patent No.: US 6,935,112 B2
(45) Date of Patent: Aug. 30, 2005

(54) MASTER CYLINDER

(75) Inventors: Naganori Koshimizu, Yamanashi-ken (JP); Tomonori Mouri, Yamanashi-ken (JP); Yasuhiko Amari, Yamanashi-ken (JP); Yoshinari Iwai, Yamanashi-ken (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 8 days.

(21) Appl. No.: 10/786,129

(22) Filed: Feb. 26, 2004

(65) Prior Publication Data

US 2004/0187494 A1 Sep. 30, 2004

(30) Foreign Application Priority Data

Mar. 31, 2003 (JP) ........................................ 2003-095464

(51) Int. Cl.⁷ ................................................. F15B 7/08
(52) U.S. Cl. ........................................................ 60/588
(58) Field of Search .................................. 60/588, 589

(56) References Cited

U.S. PATENT DOCUMENTS 4,524,585 A  6/1985 Coll et al.
4,945,729 A  * 8/1990 Hayashida et al. ............ 60/588
6,694,732 B2 * 2/2004 Tsubouchi ..................... 60/562
6,848,257 B2 * 2/2005 Bacardit et al. ............... 60/588

* cited by examiner

Primary Examiner—Edward K. Look
Assistant Examiner—Michael Leslie
(74) Attorney, Agent, or Firm—Wenderoth, Lind & Ponack, L.L.P.

(57) ABSTRACT

A master cylinder comprises a cylinder body in a cylindrical form having one end closed and including a discharge passage and a supply passage for a brake fluid, the supply passage being communicated with a reservoir. A piston is slidably disposed in the cylinder body, so as to form a pressure chamber for supplying a fluid pressure to the discharge passage. A piston seal is provided in a circumferential groove formed in the cylinder body, which has an inner circumferential surface thereof in slidable contact with the piston and is capable of sealingly disconnecting the supply passage and the pressure chamber. The cylinder body includes a communication groove which opens into the circumferential groove and extends from the circumferential groove toward the closed end of the cylinder body to thereby connect the circumferential groove and the discharge passage. The communication groove is formed outwardly beyond a bottom surface of the circumferential groove relative to a radial direction of the cylinder body.

6 Claims, 5 Drawing Sheets

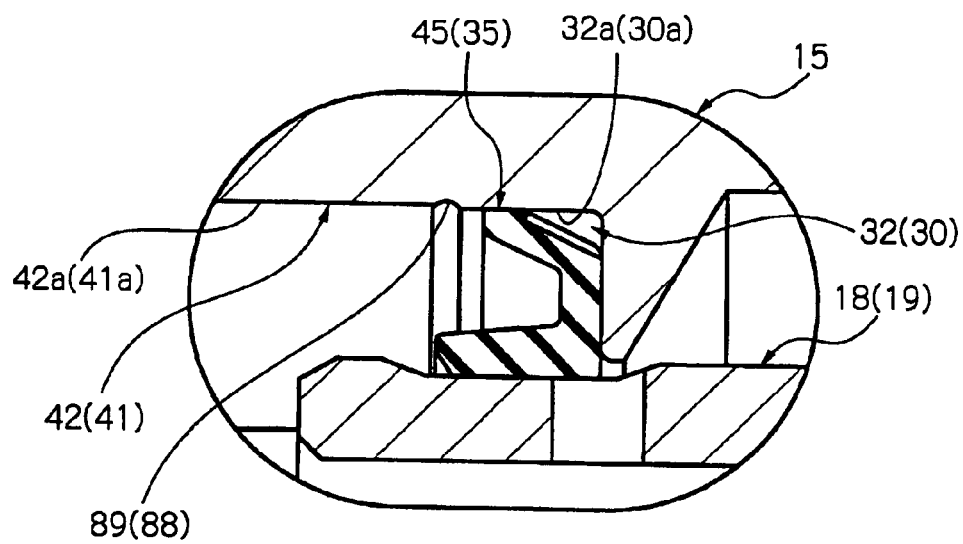
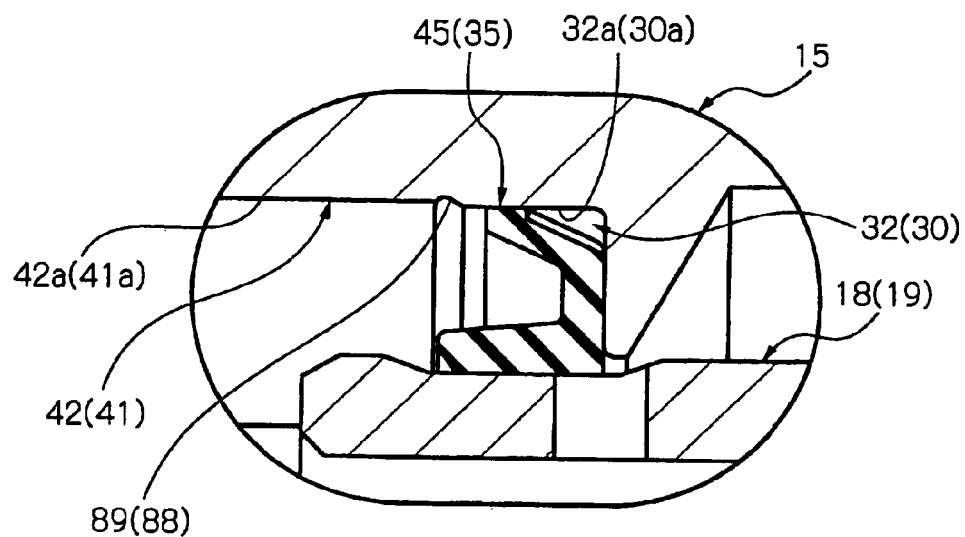

MASTER CYLINDER

BACKGROUND OF THE INVENTION

The present invention relates to a master cylinder for supplying a brake fluid to a brake apparatus of a vehicle.

As a conventional master cylinder for supplying a brake fluid to a brake apparatus of a vehicle, there is known a master cylinder comprising a cylinder formed by a cylinder body and a sleeve, which are disposed so as to form a discharge passage and a supply passage for a brake fluid. A piston is slidably disposed in the cylinder, to thereby form a pressure chamber for supplying a fluid pressure to the discharge passage between the piston and the cylinder. A piston seal capable of tightly disconnecting the supply passage and the pressure chamber from each other is provided between the cylinder and the piston. In this master cylinder in which a cylinder is formed by a sleeve and a cylinder body, the number of parts increases and the size of the cylinder radially increases, thus increasing the size of the master cylinder. Therefore, it has been proposed to use a master cylinder such as that disclosed in U.S. Pat. No. 4,524,585, in which a piston is directly inserted into a cylinder body without using a sleeve.

In this master cylinder, a cylinder body includes a communication groove which opens into a circumferential groove and extends from the circumferential groove toward a closed end of the cylinder body, to thereby allow communication between a discharge passage for a brake fluid and the circumferential groove. When releasing air from the cylinder body, a piston seal provided in the circumferential groove is opened under differential pressure, and the brake fluid is flowed toward the discharge passage through a gap between the piston seal and a bottom surface of the circumferential groove, and the communication groove. In this master cylinder, the communication groove is located inward of the bottom surface of the circumferential groove, relative to a radial direction of the cylinder body. Therefore, when releasing air by applying suction, due to the action of a negative pressure in the cylinder body, an end portion near the outer circumferential surface of the piston seal adheres to a side wall surface rising from the bottom surface of the circumferential groove, thereby preventing the brake fluid from flowing into the communication groove through the gap between the outer circumferential surface of the piston seal and the bottom surface of the circumferential groove. Therefore, the supply of the brake fluid is restricted and an air releasing operation must be repeated several times.

SUMMARY OF THE INVENTION

Therefore, it is an object of the present invention to provide a master cylinder in which, when releasing air, a brake fluid can be satisfactorily supplied to a cylinder through a gap between an outer circumferential surface of a piston seal and a bottom surface of a circumferential groove, and a communication groove, so that the number of repetitions of an air releasing operation for complete release of air can be minimized.

In order to achieve the above-mentioned object, the present invention provides a master cylinder comprising a cylinder body in a cylindrical form having one end closed and including a discharge passage and a supply passage for a brake fluid, the supply passage being communicated with a reservoir. A piston is slidably disposed in the cylinder body, so as to form a pressure chamber therebetween for supplying a fluid pressure to the discharge passage. A piston seal is provided in a circumferential groove formed in the cylinder body. The piston seal has an inner circumferential surface thereof in slidable contact with the piston and is capable of sealingly disconnecting the supply passage and the pressure chamber. The cylinder body includes a communication groove which opens into the circumferential groove and extends from the circumferential groove toward the closed end of the cylinder body to thereby connect the circumferential groove and the discharge passage. The communication groove is formed outwardly beyond an outer circumferential surface of the piston seal relative to a radial direction of the cylinder body.

With this arrangement, the communication groove, which opens into the circumferential groove in which the piston seal is provided, and extends from the circumferential groove toward the closed end of the cylinder body to thereby connect the circumferential groove and the discharge passage, is formed outwardly beyond an outer circumferential surface of the piston seal relative to a radial direction of the cylinder body. Therefore, if an end surface of the outer circumferential portion of the piston seal adheres to a side wall surface of the circumferential groove, communication between the circumferential groove and the communication groove can be ensured. Therefore, when releasing air, the brake fluid smoothly flows into the communication groove, without being prevented after flowing through a gap between the outer circumferential surface of the piston seal and a bottom surface of the circumferential groove.

The present invention also provides a master cylinder comprising a cylinder body in a cylindrical form having one end closed and including a discharge passage and a supply passage for a brake fluid, the supply passage being communicated with a reservoir. A piston is slidably disposed in the cylinder body, so as to form a pressure chamber therebetween for supplying a fluid pressure to the discharge passage. A piston seal is provided in a circumferential groove formed in the cylinder body. The piston seal has an inner circumferential surface thereof in slidable contact with the piston and is capable of sealingly disconnecting the supply passage and the pressure chamber. The cylinder body includes a communication groove which opens into the circumferential groove and extends from the circumferential groove toward the closed end of the cylinder body to thereby connect the circumferential groove and the discharge passage. The communication groove is formed outwardly beyond a bottom surface of the circumferential groove relative to a radial direction of the cylinder body.

With this arrangement, the communication groove, which opens into the circumferential groove in which the piston seal is provided, and extends from the circumferential groove toward the closed end of the cylinder body to thereby connect the circumferential groove and the discharge passage, is formed outwardly beyond a bottom surface of the circumferential groove relative to a radial direction of the cylinder body. Therefore, if an end surface of the outer circumferential portion of the piston seal adheres to a side wall surface of the circumferential groove, communication between the circumferential groove and the communication groove can be ensured. Therefore, when releasing air, the brake fluid smoothly flows into the communication groove, without being prevented after flowing through a gap between the outer circumferential surface of the piston seal and a bottom surface of the circumferential groove.

The present invention further provides a master cylinder comprising a cylinder body in a cylindrical form having one end closed and including a discharge passage and a supply passage for a brake fluid, the supply passage being communicated with a reservoir. A piston is slidably disposed in the cylinder body, so as to form a pressure chamber therebetween for supplying a fluid pressure to the discharge passage. A piston seal is provided in a circumferential groove formed in the cylinder body. The piston seal has an inner circumferential surface thereof in slidable contact with the piston and is capable of sealingly disconnecting the supply passage and the pressure chamber. The cylinder body includes a communication groove which opens into the circumferential groove and extends from the circumferential groove toward the closed end of the cylinder body to thereby connect the circumferential groove and the discharge passage. A diametrically enlarged portion in an annular form is formed at an end portion of the circumferential groove on a side of the communication groove. The diametrically enlarged portion is extended beyond a bottom surface of the circumferential groove relative to a radial direction of the cylinder body.

With this arrangement, a diametrically enlarged portion in an annular form is formed at an end portion of the circumferential groove on a side of the communication groove, the diametrically enlarged portion being extended beyond a bottom surface of the circumferential groove relative to a radial direction of the cylinder body. Therefore, if an end surface of the outer circumferential portion of the piston seal adheres to a side wall surface of the circumferential groove, communication between the circumferential groove and the communication groove can be ensured. Therefore, when releasing air, the brake fluid smoothly flows into the communication groove, without being prevented after flowing through a gap between the outer circumferential surface of the piston seal and a bottom surface of the circumferential groove. Further, machining can be easily conducted as compared to forming an inclined portion having the same function in the communication groove.

BRIEF DESCRIPTION OF THE DRAWINGS

FIG. 8 is an enlarged partial side sectional view of the master cylinder of the second embodiment of the present invention, indicating a further modified example of the arrangement of the piston seal and the vicinity thereof.

FIG. 9 is an enlarged partial side sectional view of the master cylinder of the second embodiment of the present invention, indicating a further modified example of the arrangement of the piston seal and the vicinity thereof.

DETAILED DESCRIPTION OF THE INVENTION

Referring to FIGS. 1 to 4, a first embodiment of the present invention is described.

Figure 1:
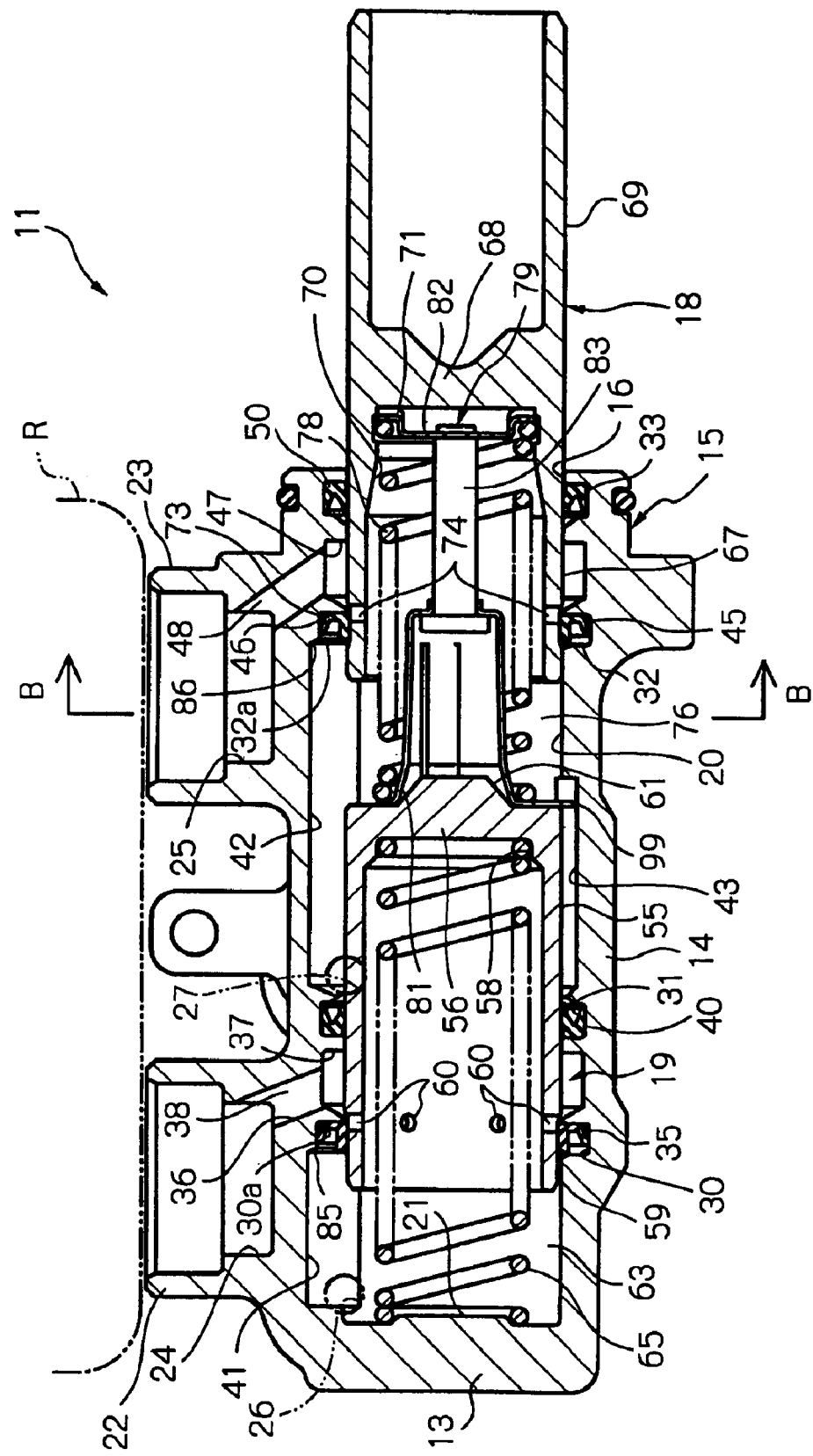
FIG. 1 is a sectional view of a master cylinder according to a first embodiment of the present invention, taken along the line A—A in FIG. 2.

In FIG. 1, reference numeral 11 denotes a master cylinder according to a first embodiment of the present invention. The master cylinder is adapted to generate a brake fluid pressure corresponding to an input from a brake pedal, which is introduced through a brake booster (not shown) into the master cylinder. A reservoir R is connected to an upper side of the master cylinder 11 so as to allow a flow of a brake fluid between the reservoir R and the master cylinder 11.

The master cylinder 11 is of a tandem type. It comprises a cylinder body 15 formed from a single workpiece into a cylinder having one end closed. Specifically, the cylinder body 15 comprises a bottom portion 13 and a cylindrical portion 14, and is horizontally mounted on a vehicle. A primary piston (piston) 18 is slidably disposed in the cylinder body 15 on a side of an open portion 16 thereof (on the right side in FIG. 1). A secondary piston 19 is slidably disposed in the cylinder body 15 on a side of the bottom portion 13 thereof (on the left side in FIG. 1) relative to the primary piston 18. The primary piston 18 and the secondary piston 19 are slidably guided by a slidable inner-diameter portion 20 having a circular cross-section perpendicular to the axis of the cylindrical portion 14 of the cylinder body 15 (hereinafter simply referred to as "the cylinder axis").

An engaging projection 21 is projected from an inner side of the bottom portion 13 of the cylinder body 15 in a direction of the cylinder axis.

The cylinder body 15 is integrally formed with a pair of mount portions 22 and 23, which are located in a predetermined position in a circumferential direction of the cylindrical portion 14 (hereinafter referred to as "the circumferential direction of the cylinder). The mount portions 22 and 23 are projected outward of the cylindrical portion 14 relative to a radial direction of the cylindrical portion 14 (hereinafter referred to as "the radial direction of the cylinder) and spaced apart from each other in the direction of the cylinder axis. Mount openings 24 and 25 for mounting the reservoir R to the mount portions 22 and 23 are formed at the same position in the circumferential direction of the cylinder.

A brake pipe (not shown) for supplying the brake fluid to a brake apparatus (not shown) is attached to a secondary discharge passage 26 and a primary discharge passage 27, which are formed in the cylindrical portion 14 of the cylinder body 15 on a side of the mount portions 22 and 23. The secondary discharge passage 26 and the primary discharge passage 27 are formed at the same position in the circumferential direction of the cylinder, and spaced apart from each other in the direction of the cylinder axis.

The slidable inner-diameter portion 20 of the cylinder body 15 includes a plurality of circumferential seal grooves formed therein, which are spaced apart from each other in the direction of the cylinder axis. Specifically, four circumferential seal grooves, i.e., a circumferential seal groove 30, a circumferential seal groove 31, a circumferential seal groove 32 and a circumferential seal groove 33 are arranged respectively in a direction from the bottom portion 13 toward the open portion 16. Each of the circumferential seal grooves 30 to 33 is formed as a portion recessed outward relative to the radial direction of the cylinder and annularly extending in the circumferential direction of the cylinder.

The circumferential seal groove 30 of the cylinder body 15, which is located at a position closest to the bottom portion 13, is formed in the proximity of the mount opening 24 on a side of the bottom portion 13. A piston seal 35 is fittingly disposed in the circumferential seal groove 30. The piston seal 35 is a cup seal having a C-shaped cross-section, and is attached to the circumferential seal groove 30, with an opening thereof facing toward the bottom portion 13.

An annular open groove 37 is formed in the cylinder body 15 on a side of the open portion 16 relative to the circumferential seal groove 30. The open groove 37 is recessed outwardly from the slidable inner-diameter portion 20 of the cylindrical portion 14 relative to the radial direction of the cylinder so that a communication hole 36 extending from the mount opening 24 on a side of the bottom portion 13 opens into the cylindrical portion 14. The open groove 37 and the communication hole 36 in combination mainly form a secondary supply passage 38, which is capable of allowing communication between the cylinder body 15 and the reservoir R and which is always communicated with the reservoir R.

A communication groove 41 is formed in the slidable inner-diameter portion 20 of the cylinder body 15 on a side of the mount portions 22 and 23 relative to the circumferential direction of the cylinder. The communication groove 41 opens into the circumferential seal groove 30 and linearly extends from the circumferential seal groove 30 toward the bottom portion 13 in the direction of the cylinder axis. The communication groove 41 is formed as a portion recessed outward relative to the radial direction of the cylinder. The communication groove 41 is adapted to allow communication between the circumferential seal groove 30 and the secondary discharge passage 26 formed in the vicinity of the bottom portion 13 between the bottom portion 13 and the circumferential seal groove 30. The communication groove 41 has an arcuate form having a radius smaller than that of the slidable inner-diameter portion 20 and centered about an axis parallel to the slidable inner-diameter portion 20.

The circumferential seal groove 31 is formed in the cylinder body 15 on a side opposite to the circumferential seal groove 30, that is, on a side of the open portion 16, relative to the open groove 37 in the direction of the cylinder axis. A partition seal 40 is fittingly disposed in the circumferential seal groove 31. The partition seal 40 is a cup seal having a C-shaped cross-section, and is attached to the circumferential seal groove 31, with an opening thereof facing toward the open portion 16.

Figure 2:
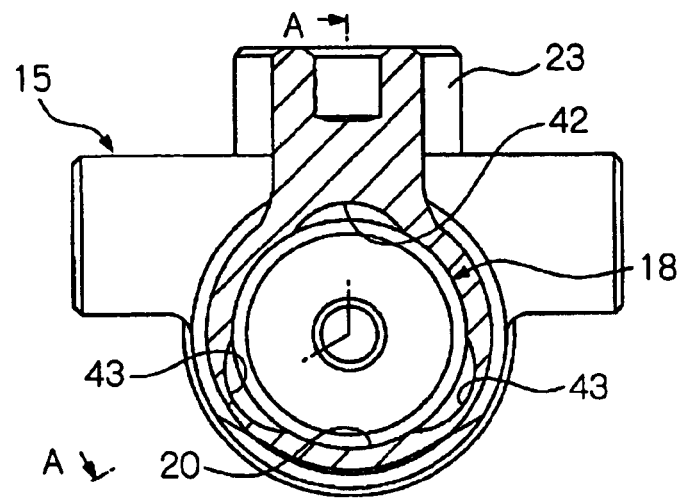
FIG. 2 is a sectional view of the master cylinder according to the first embodiment of the present invention, taken along the line B—B in FIG. 1.

A communication groove 42 is formed in the slidable inner-diameter portion 20 of the cylinder body 15 on a side of the open portion 16 relative to the circumferential seal groove 31 and on a side of the mount portions 22 and 23 relative to the circumferential direction of the cylinder. The communication groove 42 opens into the circumferential seal groove 32 and linearly extends from the circumferential seal groove 32 toward the bottom portion 13 in the direction of the cylinder axis. As shown in FIG. 2, the communication groove 42 is formed as a portion recessed from the slidable inner-diameter portion 20 relative to the radial direction of the cylinder and beyond an outer circumferential surface of a piston seal 45 (described later). The communication groove 42 is adapted to allow communication between the circumferential seal groove 32 and the primary discharge passage 27 formed in the vicinity of the circumferential seal groove 31. The communication groove 42 has an arcuate form having a radius smaller than that of the slidable inner-diameter portion 20 and centered about an axis parallel to the slidable inner-diameter portion 20. The communication groove 41 in the arcuate form has the same radius as the communication groove 42. The communication groove 41 and the communication groove 42 are formed at the same position in both the circumferential direction of the cylinder and the radial direction of the cylinder.

The slidable inner-diameter portion 20 of the cylinder body 15 includes a plurality of engaging grooves 43 (two engaging grooves 43 in this embodiment) formed therein on a side of the open portion 16 relative to the circumferential seal groove 31. The engaging grooves 43 are displaced from the mount portions 22 and 23 in the circumferential direction of the cylinder, and linearly extend in the direction of the cylinder axis from positions on a side of the open portion 16 relative to the circumferential seal groove 31 to predetermined positions displaced from the circumferential seal groove 32 toward the bottom portion 13. The engaging grooves 43 are formed as portions recessed outward relative to the radial direction of the cylinder. As indicated in FIG. 2, the engaging grooves 43 are formed at the same angle relative to the communication groove 42 on opposite sides in the circumferential direction of the cylinder. Each engaging groove 43 has an arcuate form having a radius smaller than that of the slidable inner-diameter portion 20 and centered about an axis parallel to the slidable inner-diameter portion 20.

As mentioned above, the circumferential seal groove 32 is formed in the cylinder body 15 on a side of the open portion 16 relative to the communication groove 42. The piston seal 45 is fittingly disposed in the circumferential seal groove 32. The piston seal 45 is a cup seal having a C-shaped cross-section, and is attached to the circumferential seal groove 32, with an opening thereof facing toward the bottom portion 13.

An annular open groove 47 is formed in the cylinder body 15 on a side of the open portion 16 relative to the circumferential seal groove 32. The open groove 47 is recessed outwardly from the slidable inner-diameter portion 20 of the cylindrical portion 14 relative to the radial direction of the cylinder so that a communication hole 46 extending from the mount opening 25 on a side of the open portion 16 opens into the cylindrical portion 14. The open groove 47 and the communication hole 46 in combination mainly form a primary supply passage 48, which is capable of allowing communication between the cylinder body 15 and the reservoir R and which is always communicated with the reservoir R.

The circumferential seal groove 33 is formed in the cylinder body 15 on a side opposite to the circumferential seal groove 32, that is, on a side of the open portion 16, relative to the open groove 47. A partition seal 50 is fittingly disposed in the circumferential seal groove 33. The partition seal 50 is a cup seal having a C-shaped cross-section, and is attached to the circumferential seal groove 33, with an opening thereof facing toward the bottom portion 13.

The secondary piston 19 fittingly disposed in the cylinder body 15 on a side of the bottom portion 13 has a cylindrical form having one end closed. Specifically, the secondary piston 19 comprises a cylindrical portion 55 and a bottom portion 56 formed on one side of the cylindrical portion 55 in an axial direction of the cylindrical portion 55. The secondary piston 19 is slidably fitted into the slidable inner-diameter portion 20 of the cylinder body 15, with the cylindrical portion 55 being located on a side of the bottom portion 13 of the cylinder body 15. A small-diameter inner circumferential portion 58 having a diameter smaller than an inner diameter of the cylindrical portion 55 is formed in the bottom portion 56 on a side of the cylindrical portion 55. An annular stepped portion 59 is formed in an outer circumferential surface of an end portion of the cylindrical portion 55 on a side opposite to the bottom portion 56. The annular stepped portion 59 has a slightly smaller diameter than the other portion of the cylindrical portion 55. The annular stepped portion 59 of the cylindrical portion 55 includes a plurality of ports 60 radially formed therein on a side of the bottom portion 56. The ports 60 extend through the annular stepped portion 59 in the radial direction of the cylinder.

A taper portion 61 is formed in the center, in a radial direction, of the bottom portion 56 of the secondary piston 19. The taper portion 61 is projected toward the primary piston 18 in the direction of the cylinder axis, while being diametrically enlarged toward the bottom portion 13.

A space surrounded by the bottom portion 13 of the cylinder body 15, the cylindrical portion 14 on a side of the bottom portion 13 and the secondary piston 19 forms a secondary pressure chamber 63 for supplying a fluid pressure to the secondary discharge passage 26. When the secondary piston 19 is positioned such that the ports 60 are open to the open groove 37, the secondary pressure chamber 63 is communicated with the secondary supply passage 38. An inner circumferential surface of the piston seal 35, which is disposed in the circumferential seal groove 30 of the cylinder body 15 on a side of the bottom portion 13, is adapted to make slidable contact with an outer circumferential surface of the secondary piston 19. When the secondary piston 19 moves to a position such that the ports 60 are located on a side of the bottom portion 13 relative to the piston seal 35, the piston seal 35 tightly disconnects the secondary supply passage 38 and the secondary pressure chamber 63, to thereby prevent communication between the secondary pressure chamber 63, and the secondary supply passage 38 and the reservoir R. In other words, the piston seal 35 prevents communication between the secondary pressure chamber 63, and the secondary supply passage 38 and the reservoir R when the fluid pressure in the secondary pressure chamber 63 becomes higher than the fluid pressure in the secondary supply passage 38 (i.e., atmospheric pressure) and when the fluid pressure in the secondary pressure chamber 63 becomes lower than the fluid pressure in the secondary supply passage 38, the piston seal 35 allows communication between the secondary pressure chamber 63, and the secondary supply passage 38 and the reservoir R, to thereby supply the brake fluid to the secondary pressure chamber 63.

A secondary piston spring 65 is provided between the secondary piston 19 and the bottom portion 13 of the cylinder body 15 so as to determine a spacing between the secondary piston 19 and the bottom portion 13 in an initial state in which no input is applied from the brake pedal (from the right side in FIG. 1) (the position of each portion in the initial state is hereinafter referred to as "the initial position"). The engaging projection 21 of the bottom portion 13 is disposed inside one end portion of the secondary piston spring 65, thus positioning the end portion of the secondary piston spring 65 relative to the radial direction of the cylinder. The other end portion of the secondary piston spring 65 is positioned relative to the radial direction of the cylinder when inserted through the cylindrical portion 55 of the secondary piston 19 and fitted into the small-diameter inner circumferential portion 58 of the bottom portion 56.

The primary piston 18 fittingly disposed in the cylinder body 15 on a side of the open portion 16 comprises a first cylindrical portion 67, a bottom portion 68 formed on one side of the first cylindrical portion 67 in an axial direction thereof, and a second cylindrical portion 69 formed in the bottom portion 68 on a side opposite to the first cylindrical portion 67. The primary piston 18 is disposed inside the cylinder body 15, with the first cylindrical portion 67 being located on a side of the secondary piston 19 in the cylinder body 15. An output shaft of the brake booster (not shown) is inserted into the second cylindrical portion 69, and presses the bottom portion 68. An inner circumferential surface of the first cylindrical portion 67 on a side of the bottom portion 68 includes a tapered open portion 70, which is tapered toward the bottom portion 68. An annular spring engagement groove 71, which has a larger diameter than the smallest-diameter portion of the tapered open portion 70, is formed in the inner circumferential surface of the first cylindrical portion 67 on a side of the bottom portion 68 relative to the tapered open portion 70.

An annular recessed portion 73 is formed in an outer circumferential surface of an end portion of the first cylindrical portion 67 on a side opposite to the bottom portion 68. The recessed portion 73 has a slightly smaller diameter than the other portion of the first cylindrical portion 67. The recessed portion 73 of the first cylindrical portion 67 includes a plurality of ports 74 radially formed therein on a side of the bottom portion 68. The ports 74 radially extend through the recessed portion 73.

A space surrounded by the cylindrical portion 14 of the cylinder body 15 on a side of the open portion 16, the primary piston 18 and the secondary piston 19 forms a primary pressure chamber 76 for supplying a fluid pressure to the primary discharge passage 27. When the primary piston 18 is positioned such that the ports 74 are open to the open groove 47, the primary pressure chamber 76 is communicated with the primary supply passage 48. An inner circumferential surface of the piston seal 45, which is disposed in the circumferential seal groove 32 of the cylinder body 15, is adapted to make slidable contact with an outer circumferential surface of the primary piston 18. When the primary piston 18 moves to a position such that the ports 74 are located on a side of the bottom portion 13 relative to the piston seal 45, the piston seal 45 tightly disconnects the primary supply passage 48 and the primary pressure chamber 76, to thereby prevent communication between the primary pressure chamber 76, and the primary supply passage 48 and the reservoir R. In other words, the piston seal 45 prevents communication between the primary pressure chamber 76, and the primary supply passage 48 and the reservoir R when the fluid pressure in the primary pressure chamber 76 becomes higher than the fluid pressure in the primary supply passage 48 (i.e., atmospheric pressure) and when the fluid pressure in the primary pressure chamber 76 becomes lower than the fluid pressure in the primary supply passage 48, the piston seal 45 allows communication between the primary pressure chamber 76, and the primary supply passage 48 and the reservoir R, to thereby supply the brake fluid to the primary pressure chamber 76.

The partition seal 40 in the circumferential seal groove 31 makes slidable contact with the secondary piston 19, and tightly disconnects the secondary pressure chamber 63 and the primary pressure chamber 76. The partition seal 50 in the circumferential seal groove 33 makes slidable contact with the primary piston 18, and tightly seals the primary pressure chamber 76 from external air.

A spacing adjustment mechanism 79 including a primary piston spring 78 is provided between the secondary piston 19 and the primary piston 18, which determines a spacing between the secondary piston 19 and the primary piston 18 in the initial state in which no input is applied from the brake pedal (from the right side in FIG. 1).

The spacing adjustment mechanism 79 comprises a spring retainer 81 which abuts against the bottom portion 56 of the secondary piston 19, a spring retainer 82 which abuts against the bottom portion 68 of the primary piston 18 and a shaft member 83 having one end fixed to the spring retainer 82 and supporting the spring retainer 81 while permitting slidable movement thereof in a predetermined range. The primary piston spring 78 is interposed between the spring retainers 81 and 82.

With regard to the spacing adjustment mechanism 79, an end portion of the primary piston spring 78 on a side of the spring retainer 82 is inserted into the first cylindrical portion 67, moved on the tapered open portion 70 and engaged with the spring engagement groove 71, so as to prevent the spacing adjustment mechanism 79 from being separated from the primary piston 18 in the direction of the cylinder axis.

To assemble the master cylinder 11, the secondary piston spring 65 is inserted into the cylinder body 15 from the open portion 16, with the piston seals 35 and 45 and the partition seals 40 and 50 being attached to the circumferential seal grooves 30 to 33. Thereafter, the secondary piston 19 is inserted and the spacing adjustment mechanism 79 is then inserted into the cylinder body 15, either alone or while engaged with the primary piston 18 in the above-mentioned manner, and engaged with the secondary piston 19. In this instance, the spring retainer 81 is moved along the taper portion 61 of the secondary piston 19, so that forward ends of a pair of flange portions 99 (only one of which is shown) are moved outward relative to the radial direction of the cylinder and enter the engaging grooves 43, thus preventing separation of the spacing adjustment mechanism 79 from the cylinder body 15. Consequently, the secondary piston spring 65, the secondary piston 19, the spacing adjustment mechanism 79 and the primary piston 18 are prevented from being separated from the cylinder body 15.

Figure 3:
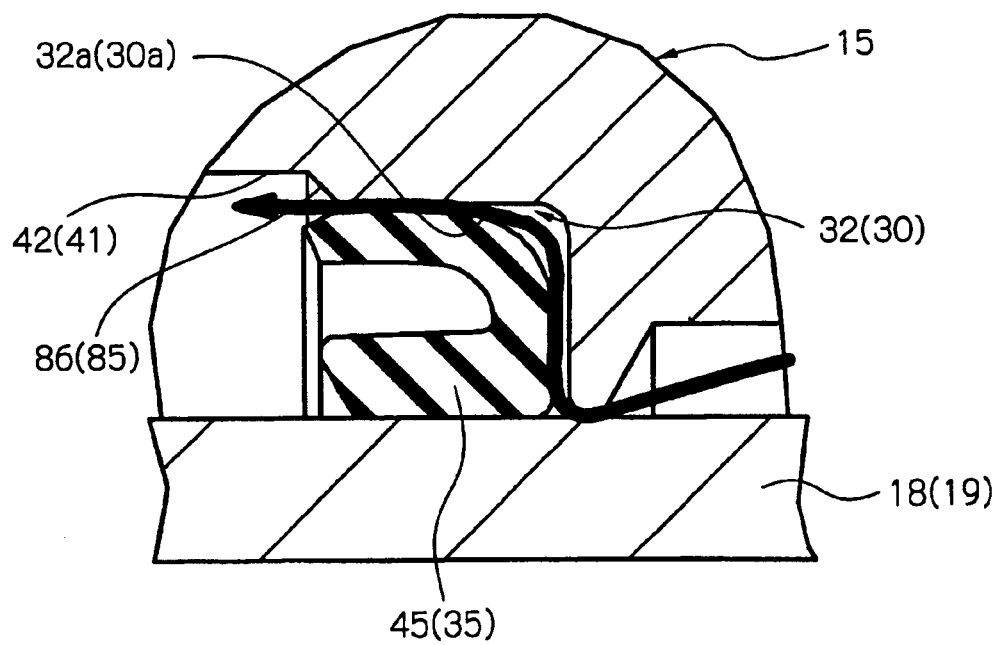
FIG. 3 is an enlarged partial side sectional view of the master cylinder of the first embodiment of the present invention, indicating an arrangement of a piston seal and the vicinity thereof.
Figure 4:
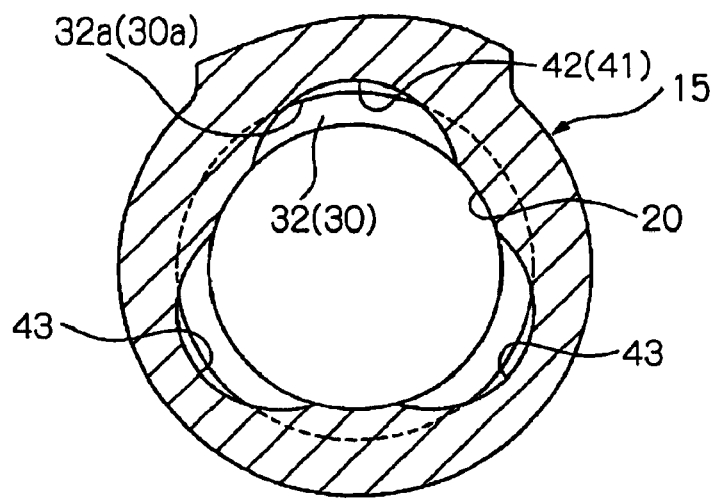
FIG. 4 is an enlarged sectional view of a cylinder body in the master cylinder of the first embodiment of the present invention.

As mentioned above, the communication groove 42 is formed as a portion recessed outward of the slidable inner-diameter portion 20 of the cylinder body 15 relative to the radial direction of the cylinder, such that one end thereof opens into the circumferential seal groove 32 and the other end thereof extends toward the bottom portion 13, thus allowing communication between the circumferential seal groove 32 and the primary discharge passage 27. In the first embodiment, as indicated in FIGS. 3 and 4, the communication groove 42 is formed outwardly beyond a bottom surface 32a of the circumferential seal groove 32 relative to the radial direction of the cylinder, which bottom surface 32a is in contact with an outer circumferential surface of the piston seal 45. (In FIGS. 3 and 4, reference numerals for primary-side elements are indicated without parentheses, and reference numerals for secondary-side elements, described later, are indicated in parentheses.) In other words, the communication groove 42 is formed outwardly beyond the outer circumferential surface of the piston seal 45 relative to the radial direction of the cylinder.

A communication-groove inclined portion 86 is formed at an end portion of the communication groove 42 on a side of the circumferential seal groove 32. The communication-groove inclined portion 86 is inclined inwardly relative to the radial direction of the cylinder and toward the open portion 16 of the cylinder body 15. In a cross-section shown in FIG. 3, the communication-groove inclined portion 86 is formed in a manner such that an intersection between the communication-groove inclined portion 86 and the bottom surface 32a of the circumferential seal groove 32 is located rightward relative to a side wall surface of the circumferential seal groove 32 located on the left side in FIG. 3. The communication-groove inclined portion 86 is formed continuously with forming the communication groove 42 by a method in which, while transferring a machining tool for forming the communication groove 42, such as an endmill cutter, in the direction of the cylinder axis, the position of the tool is controllably shifted inward relative to the radial direction of the cylinder. Alternatively, the communication-groove inclined portion 86 may be formed simultaneously with forming a part of the communication groove 42 by a method in which a machining tool including an inclined portion is used. In the former method, the communication-groove inclined portion 86 is formed such that a cross-section thereof perpendicular to the cylinder axis has the same radius of curvature at any position in the axial direction and a circumferential length thereof decreases toward the open portion 16. The communication-groove inclined portion 86 is formed so as to enable an outer circumferential portion of the piston seal 45 when protruded from the circumferential seal groove 32 toward the bottom portion 13 to easily return to the circumferential seal groove 32, and prevent damage to the outer circumferential portion of the piston seal 45.

Similarly, as mentioned above, the communication groove 41 is formed as a portion recessed outward of the slidable inner-diameter portion 20 of the cylinder body 15 relative to the radial direction of the cylinder, such that one end thereof opens into the circumferential seal groove 30 and the other end thereof extends toward the bottom portion 13, thus allowing communication between the circumferential seal groove 30 and the secondary discharge passage 26. As indicated in FIGS. 3 and 4, the communication groove 41 is formed outwardly beyond a bottom surface 30a of the circumferential seal groove 30 relative to the radial direction of the cylinder, which bottom surface 30a is in contact with an outer circumferential surface of the piston seal 35. In other words, the communication groove 41 is formed outwardly beyond the outer circumferential surface of the piston seal 35 relative to the radial direction of the cylinder.

For the same reasons as mentioned above, a communication-groove inclined portion 85 is formed at an end portion of the communication groove 41 on a side of the circumferential seal groove 30. The communication-groove inclined portion 85 is inclined inwardly relative to the radial direction of the cylinder and toward the open portion 16 of the cylinder body 15. The communication-groove inclined portion 85 is formed continuously with forming the communication groove 41 by a method in which, while transferring a machining tool for forming the communication groove 41, such as an endmill cutter, in the direction of the cylinder axis, the position of the tool is controllably shifted inward relative to the radial direction of the cylinder. Alternatively, the communication-groove inclined portion 85 may be formed simultaneously with forming a part of the communication groove 41 by a method in which a machining tool including an inclined portion is used. In the former method, the communication-groove inclined portion 85 is formed such that a cross-section thereof perpendicular to the cylinder axis has the same radius of curvature at any position in the axial direction and a circumferential length thereof decreases toward the open portion 16.

In the master cylinder in the first embodiment, the communication groove 42 of the cylinder body 15, which opens into the circumferential seal groove 32 in which the piston seal 45 is provided, and extends from the circumferential seal groove 32 toward the bottom portion 13, thus allowing communication between the circumferential seal groove 32 and the primary discharge passage 27, is formed outwardly beyond the bottom surface 32a of the circumferential seal groove 32 relative to the radial direction of the cylinder, which bottom surface 32a is in contact with the outer circumferential surface of the piston seal 45. Therefore, when releasing air, as indicated by the arrow in FIG. 3, a flow of the brake fluid through a gap between the piston seal 45 and the bottom surface 32a of the circumferential seal groove 32 to the communication groove 42 can be smoothly effected without being prevented by the side wall surface rising from the bottom surface 32a of the circumferential seal groove 32. Similarly, the communication groove 41 of the cylinder body 15, which opens into the circumferential seal groove 30 in which the piston seal 35 is provided, and extends from the circumferential seal groove 30 toward the bottom portion 13, thus allowing communication between the circumferential seal groove 30 and the secondary discharge passage 26, is formed outwardly beyond the bottom surface 30a of the circumferential seal groove 30 relative to the radial direction of the cylinder, which bottom surface 30a is in contact with the outer circumferential surface of the piston seal 35. Therefore, when releasing air, as indicated by the arrow in FIG. 3, a flow of the brake fluid through a gap between the piston seal 35 and the bottom surface 30a of the circumferential seal groove 30 to the communication groove 41 can be smoothly effected.

Therefore, when releasing air, the brake fluid can be satisfactorily supplied from the reservoir R to the cylinder through a gap between the piston seal 45 and the bottom surface 32a of the circumferential seal groove 32, and the communication groove 42, and through a gap between the piston seal 35 and the bottom surface 30a of the circumferential seal groove 30, and the communication groove 41, so that the number of repetitions of an air releasing operation for complete release of air can be minimized.

Referring to FIGS. 5 to 9, a second embodiment of the present invention will be described, mainly with regard to portions different from those in the first embodiment. The same parts or portions as used in the first embodiment are indicated by the same reference numerals, and overlapping explanation is omitted.

Figure 5:
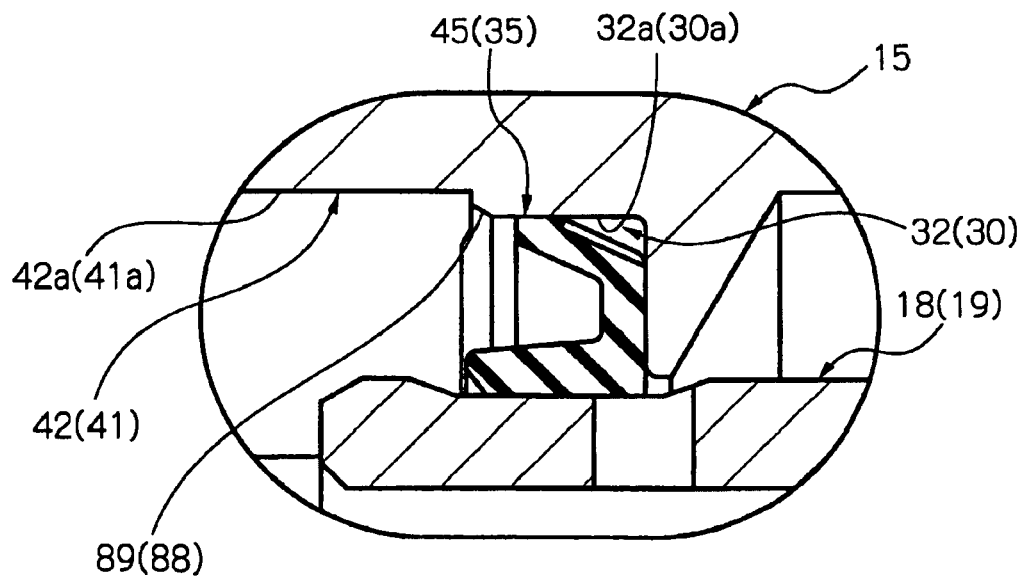
FIG. 5 is an enlarged partial side sectional view of a master cylinder of a second embodiment of the present invention, indicating an arrangement of a piston seal and the vicinity thereof.

In the second embodiment, as shown in FIG. 5, no communication-groove inclined portion 85 such as that in the first embodiment is formed at the end portion of the communication groove 42 on a side of the circumferential seal groove 32. No communication-groove inclined portion such as that (86) in the first embodiment is formed at the end portion of the communication groove 41 on a side of the circumferential seal groove 30. (In FIGS. 4 to 9, primary-side elements are indicated by reference numerals without parentheses, and secondary-side elements are indicated by reference numerals in parentheses.)

Instead, a circumferential-groove inclined portion (a diametrically enlarged portion) 89 is formed at an end portion of the circumferential seal groove 32 on a side of the communication groove 42. The circumferential-groove inclined portion 89 is extended from the bottom surface 32a of the circumferential seal groove 32, while being diametrically enlarged, such that it is inclined outwardly relative to the radial direction of the cylinder and toward the bottom portion 13 of the cylinder body 15 (toward the left side in FIGS. 4 to 9). A circumferential-groove inclined portion 88 is formed at an end portion of the circumferential seal groove 30 on a side of the communication groove 41. The circumferential-groove inclined portion 88 is extended from the bottom surface 30a of the circumferential seal groove 30, while being diametrically enlarged, such that it is inclined outwardly relative to the radial direction of the cylinder and toward the bottom portion 13.

The circumferential-groove inclined portion 89 is formed by forming an annular narrow groove extending in the circumferential direction of the cylinder. In a cross-section of FIG. 5, this narrow groove is shown to have the inclined portion 89 in the form of a chamfer. At a portion where the communication groove 42 does not open into the circumferential seal groove 32, the narrow groove appears as a continuous circumferential recess at the boundary between the bottom surface 32a and the left-side lateral surface of the circumferential seal groove 32. The narrow groove is tapered to form the circumferential-groove inclined portion 89, and formed to terminate at a point inward of a bottom surface 42a of the communication groove 42 relative to the radial direction of the cylinder. Similarly, a narrow groove forming the circumferential-groove inclined portion 88 is an annular groove extending in the circumferential direction of the cylinder. It is tapered, and formed to terminate at a point inward of the bottom surface 41a of the communication groove 41 relative to the radial direction of the cylinder.

Thus, in the master cylinder of the second embodiment, the annular circumferential-groove inclined portion 89 is formed at the end portion of the circumferential seal groove 32 on a side of the communication groove 42, which is inclined from the bottom surface 32a outwardly relative to the radial direction of the cylinder and toward the bottom portion 13 of the cylinder body 15. Therefore, machining can be easily conducted as compared to the first embodiment in which the communication-groove inclined portion 86 is formed in the communication groove 42. Similarly, the annular circumferential-groove inclined portion 88 is formed at the end portion of the circumferential seal groove 30 on a side of the communication groove 41, which is inclined from the bottom surface 30a outwardly relative to the radial direction of the cylinder and toward the bottom portion 13. Therefore, machining can be easily conducted as compared to the first embodiment in which the communication-groove inclined portion 85 is formed in the communication groove 41.

For example, as for primary-side elements, when the communication-groove inclined portion 86 is formed in the communication groove 42 in the first embodiment, the communication-groove inclined portion 86 is formed continuously or simultaneously with forming the communication groove 42 using the same machining tool. In this case, although the inclination of the communication-groove inclined portion 86 can be accurately started at a predetermined position in the communication groove 42, if the relationship between the depth of the circumferential seal groove 32 and the depth of the communication groove 42 deviates from that of the design, the communication-groove inclined portion 86 may reach a position where a part of the piston seal 45 exists on the bottom surface 32a of the circumferential seal groove 32, thus impairing a tight seal provided by the piston seal 45. Therefore, the circumferential seal groove 32 and the communication groove 42 are required to be formed with high machining accuracy. When the annular circumferential-groove inclined portion 89 is formed in the circumferential seal groove 32 on a side of the communication groove 42, the circumferential-groove inclined portion 89 can be formed continuously or simultaneously with forming the circumferential seal groove 32 using the same machining tool. Therefore, if the depth of the circumferential seal groove 32 or the depth of the communication groove 42 deviates from the designed value, the inclination of the circumferential-groove inclined portion 89 can be accurately started at a predetermined position in the circumferential seal groove 32. Therefore, there is substantially no risk of the circumferential-groove inclined portion 89 reaching the seal position of the piston seal 45 on the bottom surface 32a of the circumferential seal groove 32. Therefore, machining accuracy is not required to be so high, and machining can be easily conducted.

Figure 6:
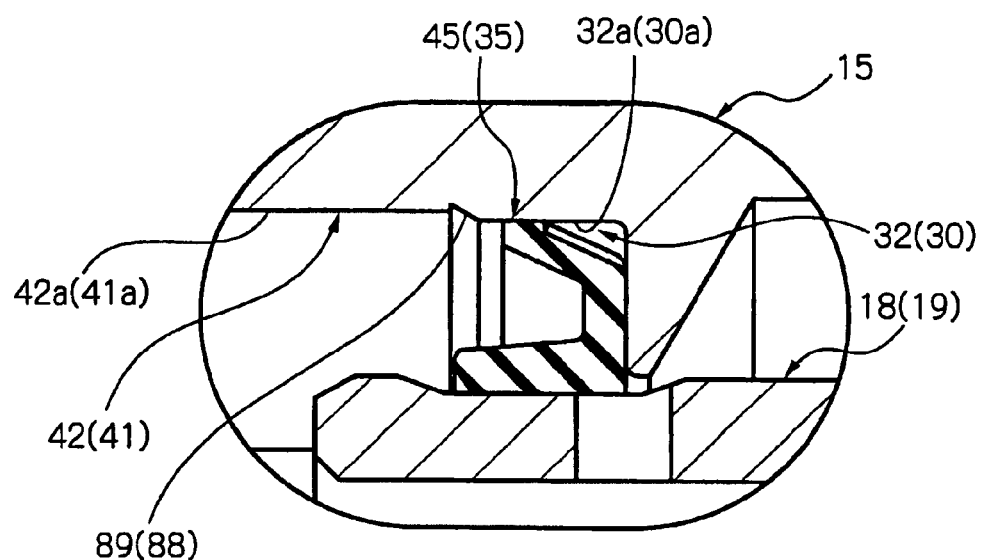
FIG. 6 is an enlarged partial side sectional view of the master cylinder of the second embodiment of the present invention, indicating a modified example of the arrangement of the piston seal and the vicinity thereof.
Figure 7:
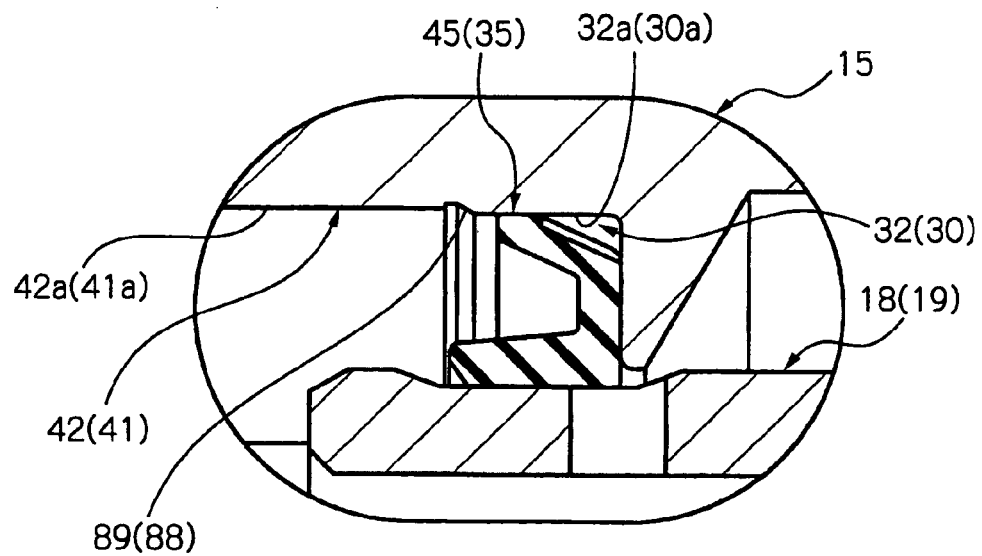
FIG. 7 is an enlarged partial side sectional view of the master cylinder of the second embodiment of the present invention, indicating another modified example of the arrangement of the piston seal and the vicinity thereof.

As indicated in FIG. 6, the circumferential-groove inclined portion 89 (88) in the second embodiment may be extended to a position located outwardly beyond the bottom surface 42a (41a) of the communication groove 42 (41) relative to the radial direction of the cylinder. In this case, as indicated in FIG. 7, the circumferential-groove inclined portion 89 (88) may include, on a side of the bottom portion 13, a linear portion extending in the direction of the cylinder axis.

As indicated in FIG. 8, the circumferential-groove inclined portion 89 (88) may be a part of an arcuate cross-section, in which the bottom surface of the circumferential groove is first extended from the bottom surface 32a (30a) while being diametrically enlarged, such that it is inclined outwardly relative to the radial direction of the cylinder and toward the bottom portion 13 of the cylinder body 15, and then extended, such that it is inclined inwardly relative to the radial direction of the cylinder and toward the bottom portion 13.

As indicated in FIG. 9, the circumferential-groove inclined portion 89 (88) may be a part of a cross-section in which the bottom surface of the circumferential groove is first formed in a taper form and extended from the bottom surface 32a (30a) while being diametrically enlarged, such that it is inclined outwardly relative to the radial direction of the cylinder and toward the bottom portion 13 of the cylinder body 15, then diametrically enlarged in an arcuate cross-section such that it is inclined outwardly relative to the radial direction of the cylinder and toward the bottom portion 13, and finally inclined, in an arcuate cross-section, inwardly relative to the radial direction of the cylinder and toward the bottom portion 13.

As has been described above, according to the present invention, the communication groove, which opens into the circumferential groove in which the piston seal is provided, and extends from the circumferential groove toward the closed end of the cylinder body to thereby connect the circumferential groove and the discharge passage, is formed outwardly beyond an outer circumferential surface of the piston seal relative to a radial direction of the cylinder body. Therefore, if an end surface of the outer circumferential portion of the piston seal adheres to a side wall surface of the circumferential groove, communication between the circumferential groove and the communication groove can be ensured. Therefore, when releasing air, the brake fluid smoothly flows into the communication groove, without being prevented after flowing through a gap between the outer circumferential surface of the piston seal and a bottom surface of the circumferential groove. Thus, when releasing air, the brake fluid can be satisfactorily supplied to the cylinder through a gap between the piston seal and the bottom surface of the circumferential groove, and the communication groove, so that the number of repetitions of an air releasing operation for complete release of air can be minimized.

According to the present invention, the communication groove, which opens into the circumferential groove in which the piston seal is provided, and extends from the circumferential groove toward the closed end of the cylinder body to thereby connect the circumferential groove and the discharge passage, is formed outwardly beyond a bottom surface of the circumferential groove relative to a radial direction of the cylinder body. Therefore, if an end surface of the outer circumferential portion of the piston seal adheres to a side wall surface of the circumferential groove, communication between the circumferential groove and the communication groove can be ensured. Therefore, when releasing air, the brake fluid smoothly flows into the communication groove, without being prevented after flowing through a gap between the outer circumferential surface of the piston seal and a bottom surface of the circumferential groove. Thus, when releasing air, the brake fluid can be satisfactorily supplied to the cylinder through a gap between the piston seal and the bottom surface of the circumferential groove, and the communication groove, so that the number of repetitions of an air releasing operation for complete release of air can be minimized.

Further, according to the present invention, a diametrically enlarged portion in an annular form is formed at an end portion of the circumferential groove on a side of the communication groove, the diametrically enlarged portion being extended from a bottom surface of the circumferential groove while being diametrically enlarged, such that it is inclined outwardly relative to the radial direction of the cylinder body. Therefore, if an end surface of the outer circumferential portion of the piston seal adheres to a side wall surface of the circumferential groove, communication between the circumferential groove and the communication groove can be ensured. Therefore, when releasing air, the brake fluid smoothly flows into the communication groove, without being prevented after flowing through a gap between the outer circumferential surface of the piston seal and a bottom surface of the circumferential groove. Further, machining can be easily conducted as compared to forming an inclined portion having the same function in the communication groove.

What is claimed is:

1. A master cylinder comprising:

a cylinder body in a cylindrical form having one end closed and including a discharge passage and a supply passage for a brake fluid, said supply passage being communicated with a reservoir;

a piston slidably disposed in said cylinder body, said piston and said cylinder body forming a pressure chamber therebetween for supplying a fluid pressure to said discharge passage; and a piston seal provided in a circumferential groove formed in said cylinder body, said piston seal having an inner circumferential surface thereof in slidable contact with said piston and being capable of sealingly disconnecting said supply passage and said pressure chamber, wherein:

said cylinder body includes a communication groove which opens into said circumferential groove and extends from the circumferential groove toward the closed end of the cylinder body to thereby connect said circumferential groove and said discharge passage; and said communication groove is formed outwardly beyond an outer circumferential surface of the piston seal relative to a radial direction of the cylinder body.

2. A master cylinder according to claim 1, wherein:

said cylinder body has an open end remote from the closed end of the cylinder body; and a communication-passage inclined portion is formed at the end portion of said communication passage on a side of the circumferential groove, said communication-passage inclined portion being inclined inwardly relative to the radial direction of the cylinder body and toward the open end of the cylinder body.

3. A master cylinder comprising:

a cylinder body in a cylindrical form having one end closed and including a discharge passage and a supply passage for a brake fluid, said supply passage being communicated with a reservoir;

a piston slidably disposed in said cylinder body, said piston and said cylinder body forming a pressure chamber therebetween for supplying a fluid pressure to said discharge passage; and a piston seal provided in a circumferential groove formed in said cylinder body, said piston seal having an inner circumferential surface thereof in slidable contact with said piston and being capable of sealingly disconnecting said supply passage and said pressure chamber, wherein:

said cylinder body includes a communication groove which opens into said circumferential groove and extends from the circumferential groove toward the closed end of the cylinder body to thereby connect said circumferential groove and said discharge passage; and said communication groove is formed outwardly beyond a bottom surface of said circumferential groove relative to a radial direction of the cylinder body.

4. A master cylinder according to claim 3, wherein:

said cylinder body has an open end remote from the closed end of the cylinder body; and a communication-passage inclined portion is formed at the end portion of said communication passage on a side of the circumferential groove, said communication-passage inclined portion being inclined inwardly relative to the radial direction of the cylinder body and toward the open end of the cylinder body.

5. A master cylinder comprising:

a cylinder body in a cylindrical form having one end closed and including a discharge passage and a supply passage for a brake fluid, said supply passage being communicated with a reservoir;

a piston slidably disposed in said cylinder body, said piston and said cylinder body forming a pressure chamber therebetween for supplying a fluid pressure to said discharge passage; and a piston seal provided in a circumferential groove formed in said cylinder body, said piston seal having an inner circumferential surface thereof in slidable contact with said piston and being capable of sealingly disconnecting said supply passage and said pressure chamber, wherein:

said cylinder body includes a communication groove which opens into said circumferential groove and extends from the circumferential groove toward the closed end of the cylinder body to thereby connect said circumferential groove and said discharge passage; and a diametrically enlarged portion in an annular form is formed at an end portion of said circumferential groove on a side of the communication groove, said diametrically enlarged portion being extended beyond a bottom surface of said circumferential groove relative to a radial direction of the cylinder body.

6. A master cylinder according to claim 5, wherein said diametrically enlarged portion includes a portion which is diametrically enlarged so that its surface is inclined toward the closed end of the cylinder body.

* * * * *